(12) United States Patent
Singh et al.

(10) Patent No.: US 11,064,037 B2
(45) Date of Patent: Jul. 13, 2021

(54) SPECIFYING ELEMENT LOCATIONS WITHIN A SWARM

(71) Applicant: International Business Machines Corporation, Armonk, NY (US)

(72) Inventors: Anand Singh, Apex, NC (US); Young Hyun Oh, Cary, NC (US); Xianqing Yu, Cary, NC (US); Hamed Mohammadbagherpoor, Raleigh, NC (US); Andrew John Rindos, III, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/684,678

(22) Filed: Nov. 15, 2019

(65) Prior Publication Data

US 2021/0152647 A1 May 20, 2021

(51) Int. Cl.
| | | |
|---|---|---|
| *H04L 29/08* | (2006.01) | |
| *G06N 3/00* | (2006.01) | |
| *H04L 12/911* | (2013.01) | |
| *H04W 4/80* | (2018.01) | |
| *H04L 12/761* | (2013.01) | |

(52) U.S. Cl.
CPC ............. *H04L 67/18* (2013.01); *G06N 3/006* (2013.01); *H04L 47/82* (2013.01); *H04L 67/10* (2013.01); *H04L 45/16* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,674,403 B2 * | 1/2004 | Gray | G01S 5/0215 342/453 |
| 8,509,998 B2 | 8/2013 | Thomas | |
| 9,083,425 B1 | 7/2015 | Frolov | |
| 9,563,203 B2 | 2/2017 | Davoodi | |
| 9,596,570 B1 * | 3/2017 | Cardoso de Moura | H04L 67/18 |
| 9,651,945 B1 | 5/2017 | Erickson | |
| 10,379,842 B2 | 8/2019 | Malladi | |
| 2004/0030570 A1 | 2/2004 | Solomon | |
| 2008/0207221 A1 * | 8/2008 | Chari | H04W 48/18 455/456.1 |
| 2015/0346726 A1 | 12/2015 | Davoodi | |
| 2017/0039857 A1 * | 2/2017 | Kwan | G05D 1/101 |

(Continued)

FOREIGN PATENT DOCUMENTS

CN  103777640 B  5/2016

OTHER PUBLICATIONS

Bonomi et al., "Fog Computing and Its Role in the Internet of Things", MCC'12, Aug. 17, 2012, Helsinki, Finland, pp. 13-15, Copyright 2012 ACM 978-1-4503-1519-7/12/08.

(Continued)

*Primary Examiner* — Jeffrey R Swearingen
(74) *Attorney, Agent, or Firm* — David K. Mattheis; William H. Hartwell; Nicholas L. Cadmus

(57) ABSTRACT

Disposing individual elements within a swarm by receiving location data for swarm elements, receiving network traffic data for the swarm elements, determining new location data for a swarm element according to the location data and network traffic data of the swarm element, and sending the new location data to the swarm element.

20 Claims, 4 Drawing Sheets

(56) References Cited

U.S. PATENT DOCUMENTS

| | | |
|---|---|---|
| 2018/0007518 A1 | 1/2018 | O'Berry |
| 2018/0300124 A1 | 10/2018 | Malladi |
| 2019/0025416 A1* | 1/2019 | Celinski .................. G01S 11/06 |
| 2019/0080621 A1 | 3/2019 | Guerrini |

OTHER PUBLICATIONS

Li et al., "UAV Communications for 5G and Beyond: Recent Advances and Future Trends", in IEEE Internet of Things Journal, vol. 6, No. 2, Apr. 2019, pp. 2241-2263.

Lopez et al., "Edge-centric Computing: Vision and Challenges", ACM SIGCOMM Computer Communication Review, vol. 45, No. 5, Oct. 2015, pp. 37-42.

Mell et al., "The NIST Definition of Cloud Computing", Recommendations of the National Institute of Standards and Technology, Special Publication 800-145, Sep. 2011, 7 pages.

Mohamed et al., "UAVFog: A UAV-Based Fog Computing for Internet of Things", 8 pages, 978-1-5386-0435-9/17, © 2017 IEEE.

Mozaffari et al., "A Tutorial on UAVs for Wireless Networks: Applications, Challenges, and Open Problems", (Submitted on Mar. 2, 2018 (v1), last revised Mar. 17, 2019 (this version, v2)), arXiv:1803. 00680v2 [cs.IT] Mar. 17, 2019, 28 pages.

Narang et al., "UAV-assisted Edge Infrastructure for Challenged Networks", Conference Paper, May 2017, 7 pages, DOI: 10.1109/INFOCOMW.2017.8116353.

Perera et al., "Context Aware Computing for The Internet of Things: A Survey", IEEE Communications Surveys & Tutorials, vol. 16, No. 1, First Quarter 2014, pp. 414-454, Digital Object Identifier 10.1109/SURV.2013.042313.00197.

Qureshi et al., "Poster: Dronemap—A Cloud-based Architecture for the Internet-of-Drones", CISTER Research Center in Real-Time & Embedded Computing Systems, CISTER-TR-180103, International Conference on Embedded Wireless Systems and Networks (EWSN) Feb. 15-17, 2016, Graz, Austria, 4 pages.

Sabino et al., "Centralized Unmanned Aerial Vehicle Mesh Network Placement Scheme: A Multi-Objective Evolutionary Algorithm Approach", Sensors 2018, 18, 4387, MDPI, Received: Oct. 15, 2018; Accepted: Dec. 8, 2018; Published: Dec. 11, 2018, doi:10. 3390/s18124387, 18 pages.

Shrit et al., "A new approach to realize drone swarm using ad-hoc network," 16th Annual Mediterranean Ad Hoc Networking Workshop (Med-Hoc-Net), Budva, © 2017 IEEE, 5 pages.

YouTube, "Drones in Fog Computing—2 minute overview", video, 2 pages, <https://www.youtube.com/watch?v=-iXBGHcjyu8&feature=youtu.be&t=49>.

* cited by examiner

SPECIFYING ELEMENT LOCATIONS WITHIN A SWARM

BACKGROUND

The disclosure relates generally to managing network resources for application execution. The disclosure relates particularly to dynamically distributing a plurality of mobile network resources according to application processing and network workflow constraints.

Processing services deployed as the processing unit(s) in nearby cloud data center(s), or through edge computing deployment may be used to satisfy the computing system needs of computing environments requiring on-demand computing infrastructure and services close to their physical locations (e.g., physical proximity to data sensors and actuators) due to context and location-aware needs, and low-latency/real-time requirements.

Mobile devices, such as trucks, ships, UAVs may be used to collect and transfer data between data sources/consumers and centralized data processing centers, or to bring the data sources/consumers closer to the cloud with a mobile data transfer infrastructure. Depending upon the application and geography, a swarm of UAVs may be deployed to provide a link between the data source/consumer and the central processing center.

Depending upon the radio (e.g., WIFI, BLUETOOTH, BLE, etc.) of each UAV of a swarm, the UAV based cluster of links can use a multi-hop routing scheme where connectivity between two UAVs can be provided by one or more intermediary UAVs. Generally, each UAV has an omnidirectional arrange of coverage. Any transmitter or receiver with the radio arrange of a UAV should be able to communicate with that UAV. The communications range of a UAV can also depend upon the local geographic conditions which can include obstacles and create signal interreference/Communications range can be increased using directional antennas and signal repeaters. (Note: the terms "WIFI", "BLUETOOTH", and "BLE", may be subject to trademark rights in various jurisdictions throughout the world and are used here only in reference to the products or services properly denominated by the marks to the extent that such trademark rights may exist.)

For a swarm-based cluster of mobile resources, the total network coverage is larger than the communications range of any single member of the cluster. The coverage includes the ranges of all members which may overlap according to the arrangement of the members. The overlapping ranges enable multi-hop communications between cluster elements with signals passing through one or more intermediaries between the origin and destination elements of the cluster.

The processing workflows of distributed applications can include multiple components and have a specific hierarchical traffic pattern. Many streaming platforms use a message hub based upon a publish/subscribe model. Data producers publish messages to message hubs and data consumers subscribe the needed messages from the message hubs.

Similarly, a cluster head in an aggregator application can require a hierarchical topology. Nodes in the cluster report to the cluster head which forwards the traffic to other cluster heads to reach target nodes in those other clusters.

Tiered infrastructure if also used in big data platforms. A large application may involve front-end preprocessing, application logic, storage management, storage tiers, and more in its data flow. Front-end server load balancers, and back-end servers are used autoscaling-capable deployment scenarios/systems.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later.

Aspects of the invention disclose methods, systems and computer readable media associated with disposing individual mobile network resources within a plurality by receiving location data for swarm elements, receiving data transfer data for the swarm elements, determining new location data for a swarm element according to the location data and data transfer data of the swarm element, and sending the new location data to the swarm element.

DETAILED DESCRIPTION

Figure 1:
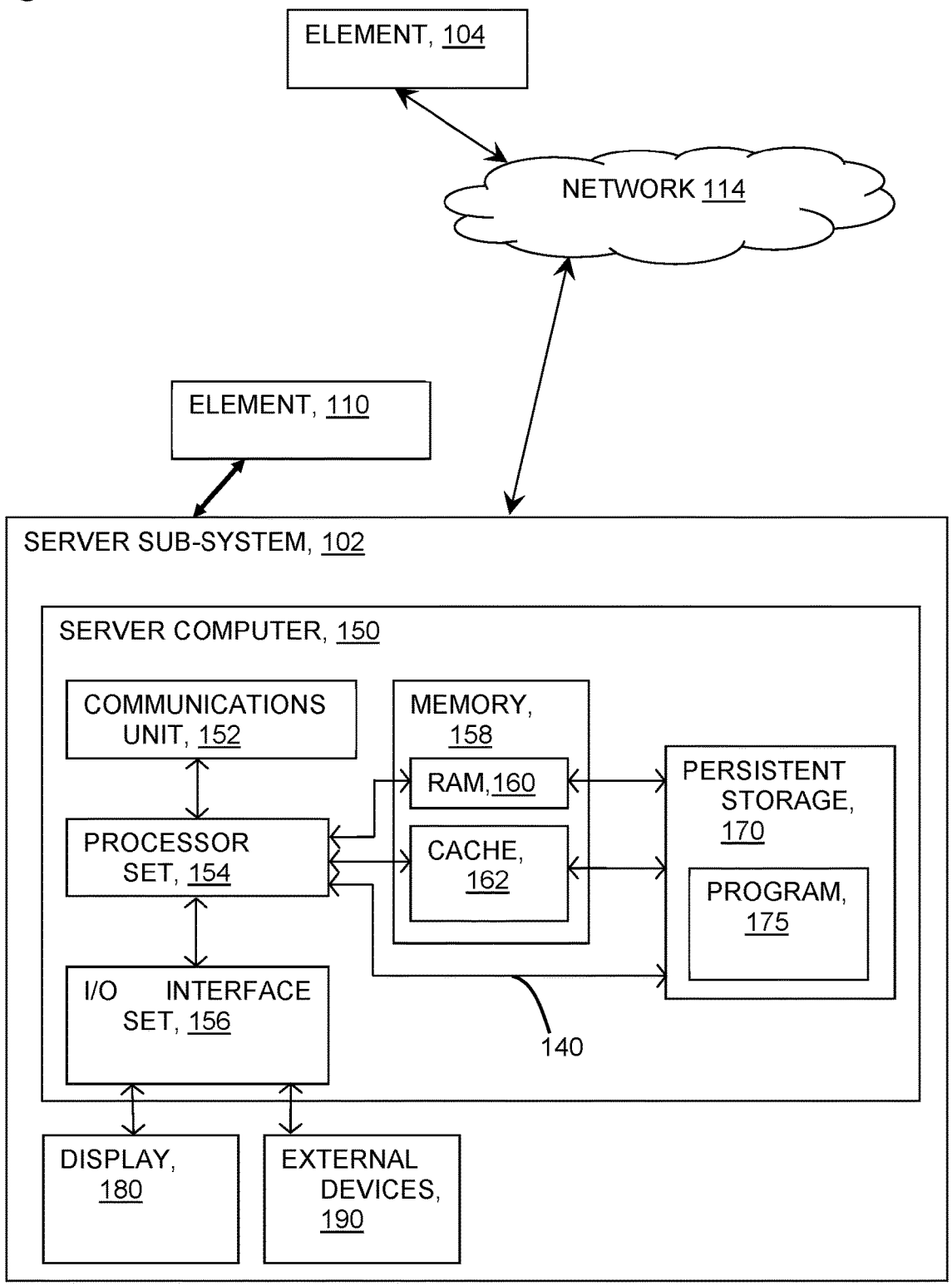
FIG. 1 provides a schematic illustration of a system, according to an embodiment of the invention.

In a traditional, fixed resource, data center, processing nodes are connected via an oversubscribed set of switch ports and switch fabric. The relative positions of the processing nodes in such a data center do not impact processing performance. For a cluster operating on a plurality of mobile elements, the relative position of the elements can impact processing performance. A tiered application running on a plurality of moving nodes may require some nodes to concurrently act as signal intermediaries between origin and destination nodes while also processing portions of the application. Depending upon the number of tiers in the application and the number of hops required to multi-hop data from sources to destinations, the impact upon application performance can be severe. What is needed is a method to manage the deployment and execution of applications across a plurality of mobile cluster elements to reduce or eliminate application performance issues arising from multi-hop communication requirements.

As an example, the performance of a streaming application having producer, consumer and message hub nodes distributed across three nodes is dependent upon the tasks of each nodes and the physical arrangement of the nodes. Disposing the message hub between the producer and consumer allows for efficient data traffic. Disposing the nodes as consumer-producer-hub, or producer-consumer-hub, requires additional signal communication hops for data to flow from the producer to the hub and then to the consumer. For the first arrangement, data flows producer-consumer (as a relay only)-hub, then hub-consumer, For the second case, data flows producer-hub then hub-producer (as a relay)-consumer.

Swarm elements can be deployed according to a number of known topologies including ring, star, tree, von-Neuman, fully-connected, toroidal, mesh and singly linked ting topologies. Different topologies provide differing degrees of connectivity between swarm elements. Swarm topology can be chosen to maximize the ground coverage area of the swarm, or to minimize the need for multi-hop communications between swarm elements. Particle swarm optimization (PSO) algorithms may be used to optimize the general location of the swarm and individual swarm elements with respect to ground-based data and network user location. In an embodiment, the method uses a PSO to optimize the location of the swarm against maximizing the signal strength between a ground-based data sending location and the swarm element receiving that data. In this embodiment, the PSO continuously monitors the location of the receiving element and the strength of the signal received by all swarm elements. In this embodiment, the PSO provides updates to the system cluster manager indicating location changes for the swarm to maximize the signal received by the receiving element, or options for altering which swarm element received and processes the data from the ground-based element.

In an embodiment, a cloud resource cluster comprises a plurality of mobile devices. The mobile devices comprise a device or element controller which directs the device to a specified location. The device comprises location sensing elements to determine the location of the device and any error between a current device location and a desired device location. The devices comprise motive elements to move the device from one location to another. In this embodiment, the cluster may further comprise one or more ground based, fixed location devices. The devices of the cluster communicate using wireless communications such as WIFI, BLUETOOTH, BLE, or similar technologies. In this embodiment, the cluster manager of the method receives cluster element location information. In an embodiment, the cluster manager polls the element periodically, or according to application performance thresholds, to request element location data. In an embodiment, the cluster elements continuously broadcast their respective locations for receipt by the cluster manager. The cluster manager maintains an element location database including the location(s) of any fixed cluster members.

In an embodiment, at any particular time, the cluster manager application portion of the method resides in a particular UAV or other member element of the cluster. In some embodiments, the cluster manager is decentralized and is deployed on each element of the cluster. Over time, as the cluster manager host element necessarily withdraws from the cluster (e.g., due to low fuel levels), a new instance of the cluster manager is instantiated in a second cluster element and the functionality of the cluster manager continues after the previous host withdraws from the cluster. In some embodiments, the cluster manager resides in a fixed location element of the cluster. In some embodiments, the cluster manager is decentralized, and functionality is distributed across the various elements of the swarm of elements. In an embodiment, the location data includes global positioning system (GPS) data. In some embodiments, the GPS location data is augmented with WIFI positioning system data (WPS).

In an embodiment, the cluster manager also receives network traffic data from each of the cluster elements. In some embodiments, the cluster manger polls the elements for the traffic data at periodic intervals, or according to networked application performance levels and defined performance thresholds. In some embodiments, the cluster elements broadcast their traffic data at regular intervals, continuously, or according to performance relative to defined performance thresholds. The network data traffic data includes the volume of data transferred between elements, as well as the number of multi-hops in each transfer, and the hierarchy of the transfer-upstream or downstream.

In an embodiment, elements of the cluster preform aspects of processing applications as well as providing multi-hop networking links. In this embodiment, the cluster manager receives application processing status data from the respective elements of the cluster in addition to the network traffic and location data.

In an embodiment, the cluster manager evaluates cluster configuration options to reduce/eliminate the number of multi-hop data transfers based upon the received location and network traffic data. In an embodiment, the cluster manager seeks to reduce/eliminate multi-hops by reconfiguring the distribution of the functionality of the distributed applications across the elements of the cluster. In this embodiment, the cluster manager generates a hypothetical arrangement of application functions across the cluster and calculates the number of multi-hops associated with the generated arrangement. In an embodiment, the cluster manager begins by shifting the location of the current application function associated with the highest number of multi-hops to a new cluster element, followed by calculating the new number of multi-hops associated with the function. The cluster manager proceeds with each application function, calculating the number of multi-hops associated with different possible cluster element positions and summing the total number of multi-hops associated with each new cluster configuration of the application functions. The cluster manager determines the new configuration having the minimum number of multi-hops. In this embodiment, the cluster manager identifies a new configuration of application services and initiates a transfer of services from the nodes of the existing configuration to the nodes of the new, optimized configuration. After the cluster manager migrates the services to the optimized noes, the method continues to monitor system performance according to data transfers and continues to evaluate new configurations against reducing the number of multi-hop data transfers required by the distributed application.

In an embodiment, the cluster manager of the method receives the location and network traffic data from swarm/cluster elements, evaluates the data as above and determines a new topology/configuration which would reduce the number of multi-hop data transfers required in support of the distributed application. In this embodiment, the cluster manager then determines a new cluster element location configuration which supports the optimized application execution in terms of revising the location of the mobile cluster elements rather than the services provided by the respective cluster elements. In this embodiment, the cluster manager communicates to the respective cluster element controllers, any revisions to their current location. In this embodiment, not all cluster elements will necessarily require relocation. The new location information may be provided as relative to the elements' current locations, relative to a central mobile element, relative to a fixed, ground location, or in absolute GPS terms. In an embodiment, the cluster element controllers direct the elements to move to new locations as needed, after receipt of location information from the cluster manager of the method.

In an embodiment, the new locations are optimized using the data transfer and old locations of the swarm elements. In an embodiment, the new locations are determined using the old location data and the service functionality of the distributed application assigned to each member of the swarm. In this embodiment, the cluster manager uses a defined hierarchy or tiering of applications services to determine an optimal arrangement of services among the elements of the swarm. In this embodiment, the cluster manager calculates the number of multi-hop communications according to the relationships between cluster element services and cluster element locations within the current and potential future configurations.

As an example, a swarm of UAVs run one or more application server, container, and/or network functions. The cluster manager collects location and network traffic information from the swarm elements over wireless communications. The cluster manager evaluates the upstream-downstream network data traffic and the number of multi-hops required to support the applications. The method uses a tree with the Maximum Used Neighbor First approach to optimize the configuration of the mobile swarm elements according to the traffic data received. New locations are determined for at least some of the swarm elements. The new locations are transmitted to the swarm elements and the elements take up their new locations. The process returns to the beginning and the new/current configuration is evaluated for possible changes.

In an embodiment, as swarm elements leave the swarm, the current configuration is evaluated in terms of which elements support which applications services and opportunities to reconfigure the swarm in view of the loss of one or more elements. In some embodiments, the loss of an element is offset by the arrival of a replacement element. In an embodiment, the replacement is configured in terms of location and supported application services, by the cluster manager prior to arrival at the swarm location, according to a planned departure of its predecessor. In an embodiment, the departure of an element is unplanned, and the cluster manager must reevaluate the swarm in terms of required application functionality and locations with the remaining elements of the swarm.

In a clustered computing environment, a scaling policy controls on-demand resources to impact a customer's cost-performance tradeoffs. Application instances can be added or removed according to the scaling policy as computing needs change. In a fixed resource data center, the reactive scaling policy operates according to two parameters. When to scale (time-based parameter) and how much to scale (resource-based parameter) are used by the policy to schedule the allocation/deallocation of sufficient resource to maintain application performance while keeping customer costs as low as practical.

For a cluster comprised of mobile elements, the scaling policy also considers a third parameter associated with where, within the cluster, to add or remove resources. Placement or removal of an element, or an application instance within an element, can impact the physical connectivity between the cluster elements, the application topology and performance, and the energy consumption of the cluster elements as a whole. What is needed is a scaling policy which considers element connectivity, application performance, and cluster energy consumption as resources are allocated according to changing computing needs of customers.

As an example, a streaming application comprises 3 nodes, consumer, message hub and producer, arranged in series as nodes 1-2-3. A fourth node needs to be added to run an application processing producer data for the consumer. Ideally, this fourth node should be disposed in parallel with node 2, between nodes 1 and 3, to optimize communications and overall performance by providing direct 1-4-3 communications paths.

In an embodiment, the method applies the scaling policy across the existing swarm elements and the application instances deployed across these elements. In this embodiment, the cluster manager of the method periodically receives data from each swarm member element. In an embodiment, the data includes battery or fuel reserves of the element, location data, current application instance running on the element, as well as upstream and downstream network traffic for each application instance. The cluster manager polls the data periodically or based upon application demand thresholds, or each element proactively, or reactively sends the data at regular time intervals, continuously, or at defined thresholds of battery/fuel levels, and/or application performance. In this embodiment, the cluster manager calculates the amount of time each cluster element can remain in the cluster before departing the cluster for recharging/refueling, according to the current battery/fuel levels, energy consumption rates, and including an allowance for the time-fuel necessary to travel from the current swarm element location to the nearest swarm element refueling location.

In an embodiment, the cluster manager triggers a scaling policy-based interaction with the member elements of the swarm at regular intervals, or as a reaction to a swarm member element, or user application demand changes, or proactively in view of predicted swarm element or user application demand changes. The number of instances to scale and the amount of time available to make the changes are defined by the scaling policy of the system. In this embodiment, the cluster manager determines where, in terms of cluster elements, to add application instances to achieve the scaling policy goals for application instances. The cluster manager considers the number of multi-hop communications, in tiered applications, needed for each potential cluster element application instance host, and selects the element having the fewest multi-hop links, as the host for the next instance.

In this embodiment, the cluster manager manages the reduction of application instances due to falling demand according to the number of multi-hops. The cluster manager considers each application instance for removal in terms of the impact on the overall number of swarm multi-hop links for all remaining application instances, as well as consideration of the available battery/fuel (time remaining until cluster departure for refueling is needed) of each candidate cluster element. The cluster manager completes the addition or removal of application instances after determining the optimal cluster element of the addition or removal of the instances.

In an embodiment, the cluster manager of the method proceeds by implementing changes according to the system scaling policy in terms of adding or removing swarm elements rather than application instances. In this embodiment, the cluster manager receives location and upstream and downstream network traffic data from each cluster member element. The cluster manager polls the members for the data on a periodic or application demand threshold-based basis, or the members send the data periodically, proactively, or reactively, to the cluster manager. In this embodiment, the cluster manager determines the number of cluster elements to add or remove according to the scaling policy. For additional elements, the cluster manager determines locations within the swarm for the new elements. The cluster manager considers the changes in the number of multi-hop communication links for the overall swarm represented by each potential location for each new element. The cluster manager selects new element location to minimize the total number of multi-hop communications for the overall swarm.

The cluster manager communicates the new location to the new element and also provisions the new application instances on the new element. The new element travels to and joins the swarm at the new location with the new application instances.

For element removal due to falling application demand, the cluster manager of the method evaluates the removal of each swarm element in terms of the scaling policy needs as well as the element's location to determine and select the element which will have the greatest impact on the number of multi-hop communication links of the overall swarm, the impact of each departure on overall swarm connectivity, and the remaining battery/fuel, time to refueling departure of each swarm element, seeking to minimize the overall number of multi-hop links, preserve swarm connectivity and avoid unnecessary swarm disruptions due to refueling activities. The cluster manager communicates with the selected cluster element and the element leaves the swarm, returning to a nearby base station, or travelling to a nearby swarm needing additional elements.

FIG. 1 provides a schematic illustration of exemplary network resources associated with practicing the disclosed inventions. The inventions may be practiced in the processors of any of the disclosed elements which process an instruction stream. As shown in the figure, a networked swarm element 110 connects wirelessly to server sub-system 102. Swarm element 104 connects wirelessly to server sub-system 102 via network 114. Swarm elements 104 and 110 comprise programs and capabilities (not shown) including a cluster manager client program, a cluster topology program, networking communication capabilities, and distributed application processing functionalities, together with sufficient computing resource (processor, memory, network communications hardware) to execute the programs, capabilities, and functionalities. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the cluster topology program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of swarm elements 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., cluster topology program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
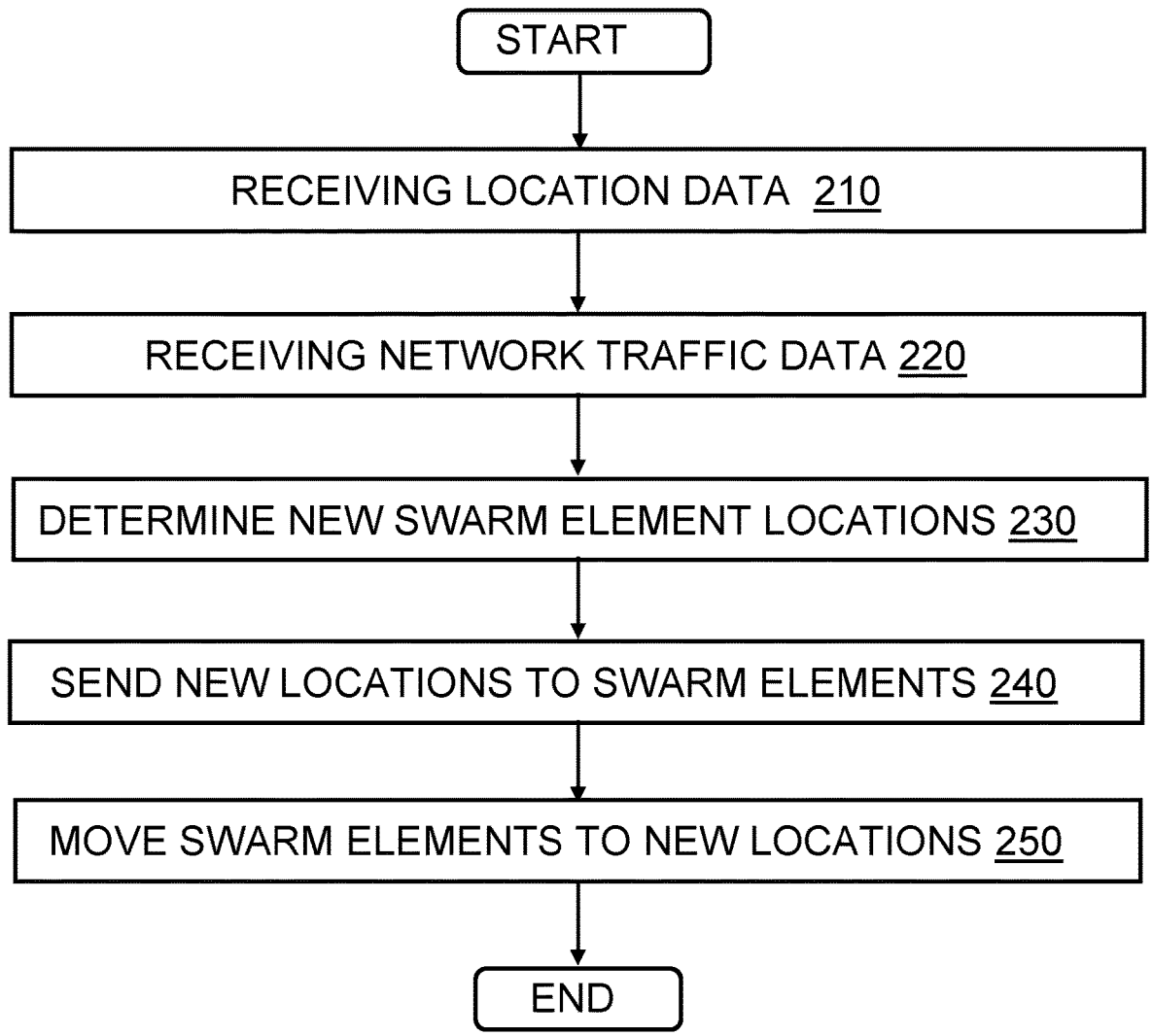
FIG. 2 provides a flowchart depicting an operational sequence, according to an embodiment of the invention.

FIG. 2 provides a flowchart 200, illustrating exemplary activities associated with the practice of the disclosure. After program start, the cluster manager of program 175 receives location data from swarm elements 104 and 110, at 210. In an embodiment, the location data includes GPS and WPS data received over a wireless network connection. At 220, the cluster manager of program 175 receives network traffic data from the swarm elements 104 and 110. The network traffic data includes upstream and downstream data flows. In an embodiment, the cluster manager also receives battery/fuel level data from the swarm elements. At 230, the cluster manager of program 175, determines a new swarm topology according to the received swarm element 104, 110, location and network traffic data. The cluster manager minimizes the number of multi-hop communications necessary for application execution in the new topology. At 240, the cluster manager of program 175 sends new location data to swarm elements 104 and 110, according to the new topology determined for the swarm. The cluster manager sends the new location data to the element controllers. At 250, the element controllers execute movements according to the new location data, bringing swarm elements 104, and 110 to the new locations in the determined topology.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
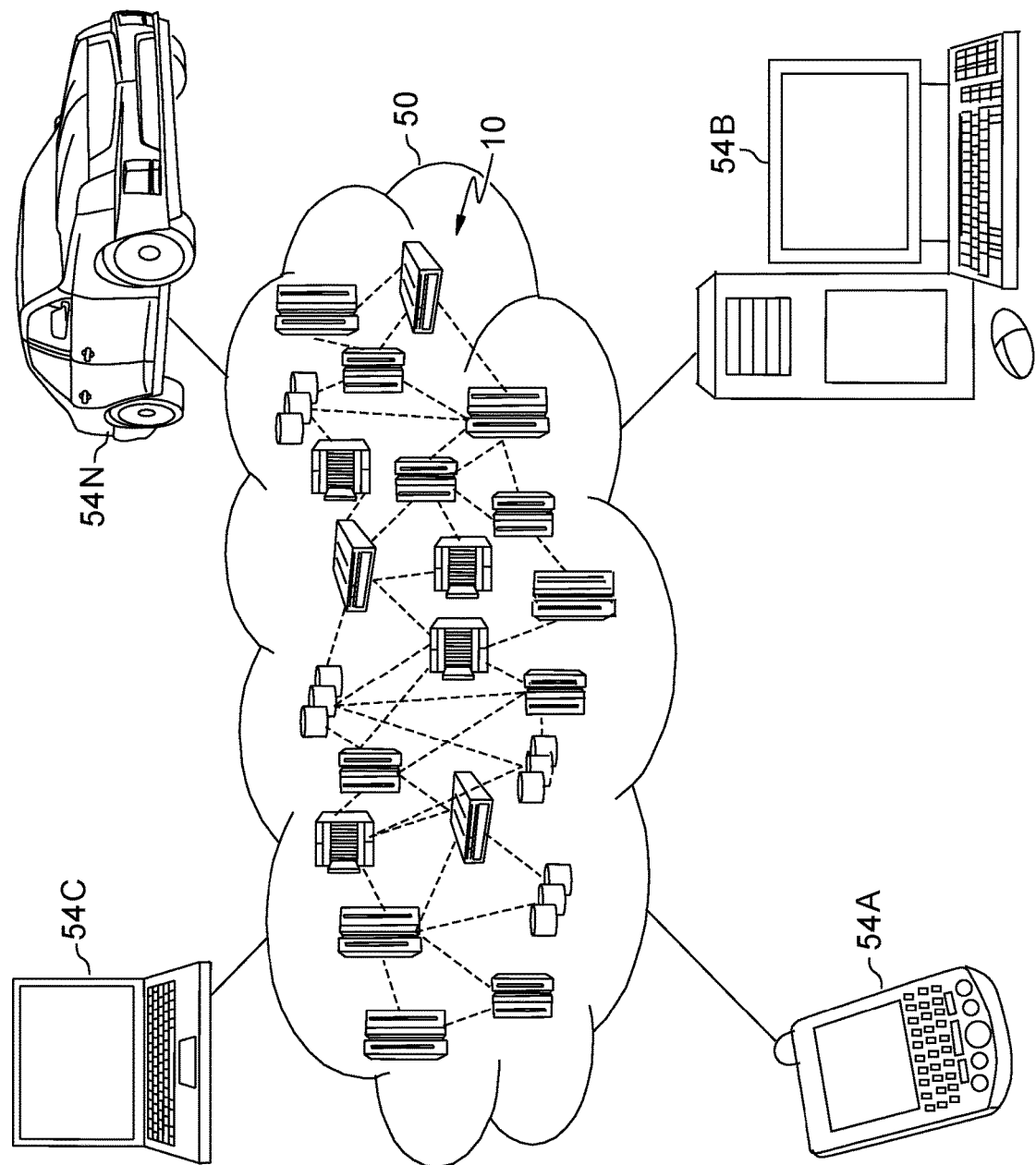
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
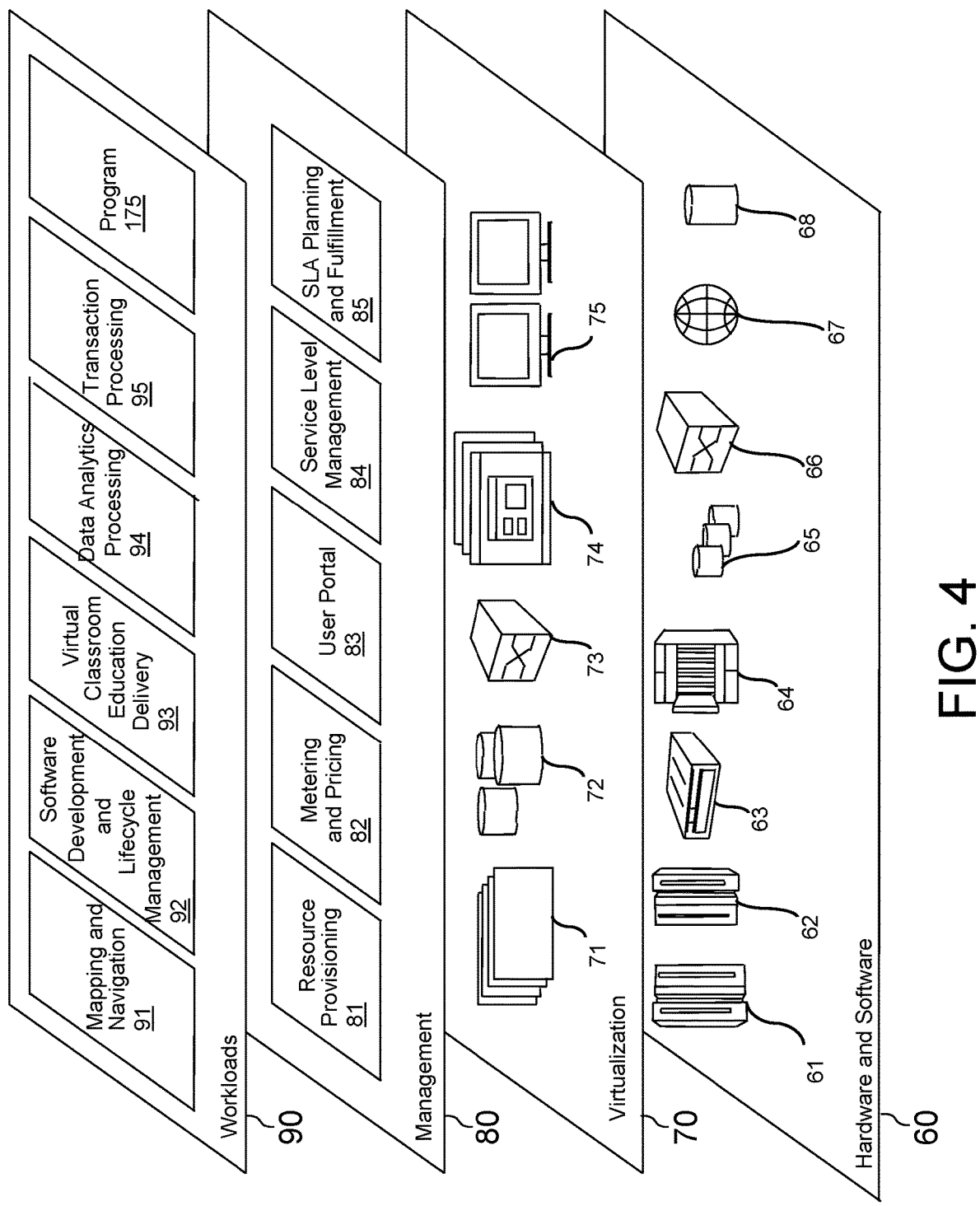
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cluster topology program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for disposing individual elements within a swarm, the method comprising:
   receiving, by one or more computer processors, location data for swarm elements;
   receiving, by the one or more computer processors, network traffic data for the swarm elements;
   determining, by the one or more computer processors, new location data for a swarm element of the swarm elements according to the location data and network traffic data of the swarm element; and
   sending, by the one or more computer processors, the new location data to the swarm element.

2. The computer implemented method according to claim 1, further comprising receiving, by the one or more computer processors, application data for the swarm elements.

3. The computer implemented method according to claim 2, wherein the new location data for the swarm element is determined according to the application data of the swarm element.

4. The computer implemented method according to claim 1, wherein the network traffic data comprises data relating to data transfers between swarm elements.

5. The computer implemented method according to claim 1, further comprising determining new location data for each swarm element of a plurality of the swarm elements according to the location data and network traffic data of each swarm element of the plurality of swarm elements; and
   sending the new location data for each swarm element of the plurality of swarm elements, to the respective swarm elements.

6. The computer implemented method according to claim 1, wherein the network traffic data comprises information about data transfers in a tiered network.

7. The computer implemented method according to claim 1, wherein the new swarm element location data is determined according to upstream-downstream data traffic in a tiered network.

8. A computer program product for disposing individual elements within a swarm, the computer program product comprising one or more computer readable storage devices and stored program instructions on the one or more computer readable storage devices, the stored program instructions comprising:
   program instructions to receive location data for swarm elements;
   program instructions to receive network traffic data for the swarm elements;
   program instructions to determine new location data for a swarm element according to the location data and network traffic data of the swarm element; and
   program instructions to send the new location data to the swarm element.

9. The computer program product according to claim 8, the stored program instructions further comprising program instructions to receive application data for the swarm elements.

10. The computer program product according to claim 9, wherein the new location data for the swarm element is determined according to the application data of the swarm element.

11. The computer program product according to claim 8, wherein the network traffic data comprises data relating to data transfers between swarm elements.

12. The computer program product according to claim 8, the stored program instructions further comprising program instructions to determine new location data for each swarm element of a plurality of the swarm elements according to the location data and network traffic data of each swarm element of the plurality of swarm elements; and
   program instructions to send the new location data for each swarm element of the plurality of swarm elements, to the respective swarm elements.

13. The computer program product according to claim 8, wherein the network traffic data comprises information about data transfers in a tiered network.

14. The computer program product according to claim 8, wherein the new swarm element location data is determined according to upstream-downstream data traffic in a tiered network.

15. A computer system for disposing individual elements within a swarm, the computer system comprising:
   one or more computer processors;
   one or more computer readable storage devices; and
   stored program instructions on the one or more computer readable storage devices for execution by the one or more computer processors, the stored program instructions comprising:
      program instructions to receive location data for swarm elements;
      program instructions to receive network traffic data for the swarm elements;
      program instructions to determine new location data for a swarm element according to the location data and network traffic data of the swarm element; and
      program instructions to send the new location data to the swarm element.

16. The computer system according to claim 15, wherein the network traffic data comprises information about data transfers in a tiered network.

17. The computer system according to claim 15, wherein the network traffic data comprises data relating to data transfers between swarm elements.

18. The computer system according to claim 15, the stored program instructions further comprising:
   program instructions to determine new location data for each swarm element of a plurality of the swarm elements according to the location data and network traffic data of each swarm element of the plurality of swarm elements; and
   program instructions to send the new location data for each swarm element of the plurality of swarm elements, to the respective swarm elements.

19. The computer system according to claim 15, the stored program instruction further comprising program instructions to receive application data for the swarm elements.

20. The computer system according to claim 19, wherein the new swarm element location data is determined according to the application data of the swarm element.

* * * * *